United States Patent
Lu et al.

(10) Patent No.: US 11,063,508 B2
(45) Date of Patent: Jul. 13, 2021

(54) CONTROLLER FOR A MULTI-PHASE CONVERTER AND FAULT DETECTION METHOD THEREOF

(71) Applicant: Chengdu Monolithic Power Systems Co., Ltd., Chengdu (CN)

(72) Inventors: Wenbin Lu, Hangzhou (CN); Wangmiao Hu, Hangzhou (CN); Lijie Jiang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 16/905,320

(22) Filed: Jun. 18, 2020

(65) Prior Publication Data
US 2020/0403494 A1    Dec. 24, 2020

(30) Foreign Application Priority Data

Jun. 21, 2019  (CN) .......................... 201910541090.8

(51) Int. Cl.
*H02M 1/32* (2007.01)
*H02M 1/00* (2006.01)

(52) U.S. Cl.
CPC ............ *H02M 1/32* (2013.01); *H02M 1/0009* (2021.05); *H02M 1/0012* (2021.05); *H02M 1/325* (2021.05)

(58) Field of Classification Search
CPC ...... H02M 1/32; H02M 1/0009; H02M 1/325; H02M 1/0012
See application file for complete search history.

(56) References Cited

U.S. PATENT DOCUMENTS

| | | | |
|---|---|---|---|
| 9,071,142 B2 | 6/2015 | Yang et al. | |
| 9,270,178 B2 | 2/2016 | Jiang et al. | |
| 9,496,792 B2 | 11/2016 | Ouyang | |
| 10,693,361 B2* | 6/2020 | Guo | G01R 31/50 |
| 2008/0310200 A1* | 12/2008 | Maksimovic | H03K 7/08 363/65 |
| 2011/0025284 A1* | 2/2011 | Xu | H02M 3/1584 323/282 |
| 2013/0307503 A1* | 11/2013 | Ouyang | H02M 3/1584 323/282 |
| 2014/0167833 A1* | 6/2014 | Jiang | H02M 3/157 327/365 |

* cited by examiner

*Primary Examiner* — Rafael O De Leon Domenech
(74) *Attorney, Agent, or Firm* — Perkins Coie LLP

(57) ABSTRACT

A fault detection method for a multi-phase converter is: sampling currents flowing through a plurality of switching circuits to generate a plurality of current sampling signals; generating a plurality of digital current signals based on a plurality of current sampling signals; generating a plurality of on-time adjustment signals based on differences between each of the plurality of digital current signals and a reference current signal; averaging the plurality of on-time adjustment signals to generate an average adjustment signal; subtracting each of the plurality of on-time adjustment signals from the average adjustment signal to generate corresponding plurality of adjustment error signals; comparing each of the plurality of adjustment error signals with a threshold signal to generate a plurality of fault signals; and adjusting control signals of the plurality of switching circuits based on the plurality of fault signals.

19 Claims, 9 Drawing Sheets

CONTROLLER FOR A MULTI-PHASE CONVERTER AND FAULT DETECTION METHOD THEREOF

This application claims the benefit of CN application No. 201910541090.8, filed on Jun. 21, 2019, and incorporated herein by reference.

TECHNICAL FIELD

The present invention generally relates to electronic circuits, and more specifically but not exclusively to a controller for a multi-phase converter and fault detection method thereof.

BACKGROUND

In recent years, multi-phase converters having a plurality of switching circuits coupled in parallel have been widely used in high-performance CPU power supplies due to their superior performance. CPU-related circuits play a central role in an application system, so a high reliability of CPU power supply circuit is needed. During a working process of the multi-phase converter, how to monitor the aging or damage of the plurality of switching circuits and skip a fault one of the plurality of switching circuit as quickly as possible to allow the entire circuits continuing working becomes a technology issue.

A conventional method is applying a current-sharing loop and calculating a difference between a current flowing through each of the plurality of switching circuits and an average current. When the difference is greater than a predetermined threshold value and lasts for a predetermined time period, it is configured to indicate the corresponding one of the plurality of switching circuits is fault. However, accuracy of sensing a current in the conventional method is not high. In some cases, comparing with other ones of the plurality of switching circuits, although an abnormal adjustment magnitude of the current flowing through one of the plurality of switching circuits occurs, a controller still indicates that the one of the plurality of switching circuits is current-sharing, which results that a system cannot detect a fault switching circuit in time and accurately.

SUMMARY

It is one of the objects of the present invention to provide a controller for a multi-phase converter and fault detection method thereof.

One embodiment of the present invention discloses a controller for a multi-phase converter, wherein the multi-phase converter comprises a plurality of switching circuits coupled in parallel, the controller comprising: an analog-to-digital conversion circuit, configured to receive a plurality of current sampling signals, and configured to generate a plurality of digital current signals based on the plurality of current sampling signals, wherein each of the plurality of current sampling signals respectively represents an associated current flowing through a corresponding one of the plurality of switching circuits; an on-time adjustment signal generation circuit, coupled to the analog-to-digital conversion circuit to receive the plurality of digital current signals, and configured to generate a plurality of on-time adjustment signals based on differences between each of the plurality of digital current signals and a reference current signal, wherein each of the plurality of on-time adjustment signals represents an on-time adjustment of the corresponding one of the plurality of switching circuits; a fault detection circuit, coupled to the on-time adjustment generation circuit to receive the plurality of on-time adjustment signals, and configured to generate a plurality of fault signals based on the plurality of on-time adjustment signals and a threshold signal; and a control circuit, coupled to the fault detection circuit to receive the plurality of fault signals, and configured to generate a plurality of control signals based on the plurality of fault signals to control the plurality of switching circuits respectively.

One embodiment of the present invention discloses a fault detection method for a multi-phase converter, wherein the multi-phase converter comprises a plurality of switching circuits coupled in parallel, the fault detection method comprising: generating a plurality of digital current signals based on a plurality of current sampling signals, wherein each of the plurality of current sampling signals respectively represents an associated current flowing through a corresponding one of the plurality of switching circuits; generating a plurality of digital current signals based on the plurality of current sampling signals; generating a plurality of on-time adjustment signals based on differences between each of the plurality of digital current signals and a reference current signal, wherein each of the plurality of on-time adjustment signals represents an on-time adjustment of the corresponding one of the plurality of switching circuits; generating a plurality of fault signals based on the plurality of on-time adjustment signals and a threshold signal; and adjusting a plurality of control signals based on the plurality of fault signals to control the plurality of switching circuits.

One embodiment of the present invention discloses a controller for a multi-phase converter, wherein the multi-phase converter comprises a plurality of switching circuits coupled in parallel, the controller comprising: an analog-to-digital conversion circuit, configured to generate a plurality of digital current signals based on a plurality of current sampling signals, wherein each of the plurality of current sampling signals represents an associated currents flowing through a corresponding one of the plurality of switching circuits; an on-time adjustment signal generation circuit, configured to generate a plurality of on-time adjustment signals based on differences between each of the plurality of digital current signals and a reference current signal, wherein the plurality of on-time adjustment signals represents on-time adjustments of the plurality of switching circuits; a fault detection circuit, configured to generate a plurality of fault signals based on the plurality of on-time adjustment signals; and a control circuit, configured to generate a plurality of control signals based on the plurality of fault signals to control the plurality of switching circuits; wherein when an absolute value of one of the plurality of on-time adjustment signals is greater than a predetermined value, a corresponding one of the plurality of control signals is configured to maintain a corresponding one of the plurality of switching circuits off.

According to the embodiments of the present invention, the on-time adjustment signal of each of the plurality of switching circuits is used to identify the fault, which avoids a failure to detect the fault phase due to low accuracy with the conventional method, and improves the precision and accuracy of the fault detection.

BRIEF DESCRIPTION OF THE DRAWING

The present invention can be further understood with reference to the following detailed description and the appended drawing, wherein like elements are provided with like reference numerals.

DETAILED DESCRIPTION

Reference will not be made in detail to be preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
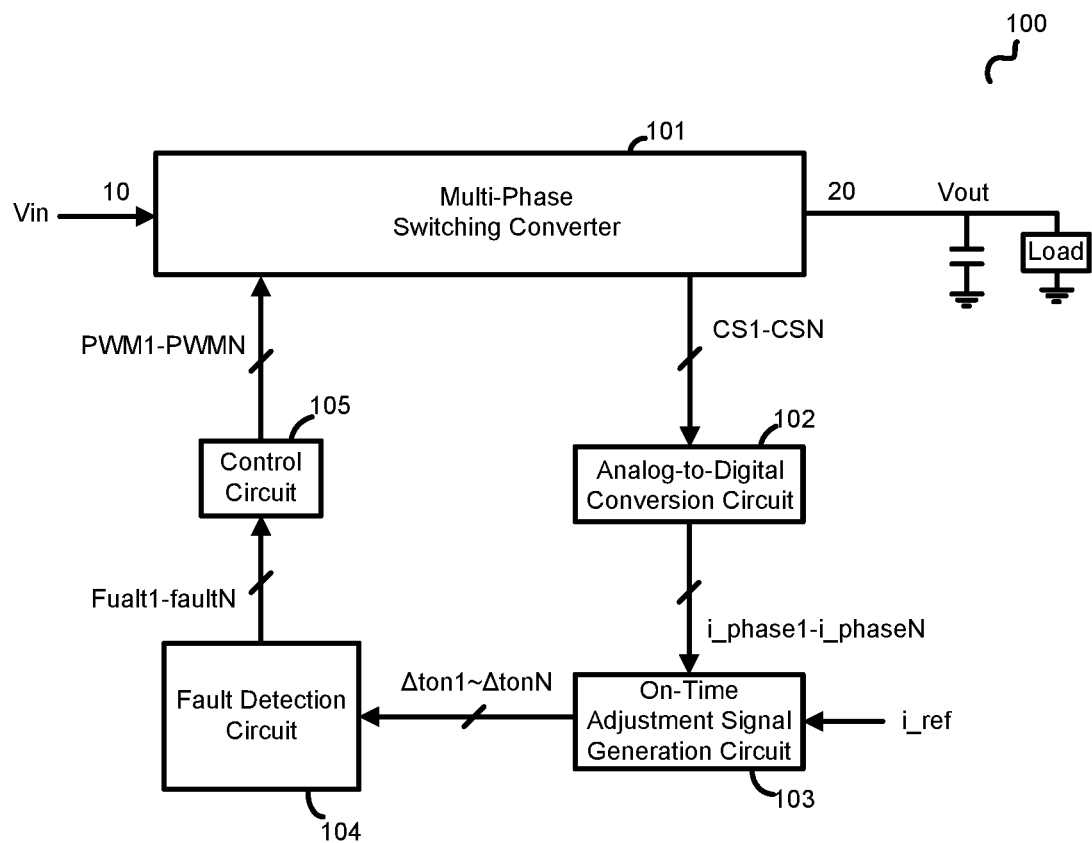
FIG. 1 illustrates a block diagram of a multi-phase converter 100 in accordance with an embodiment of the present invention.

FIG. 1 illustrates a block diagram of a multi-phase converter 100 in accordance with an embodiment of the present invention. The multi-phase converter 100 comprises a multi-phase power conversion circuit 101, an analog-to-digital conversion circuit 102, an on-time adjustment signal generation circuit 103, a fault detection circuit 104, and a control circuit 105. The multi-phase power conversion circuit 101 comprises an input terminal 10, an output terminal 20, and N switching circuits coupled in parallel between the input terminal 10 and the output terminal 20, wherein N is an integer greater than or equal to 2, the input terminal 10 is configured to receive an input voltage Vin, and the output terminal 20 is configured to provide an output voltage Vout to a load. The N switching circuits in the multi-phase power conversion circuit 101 can be DC/DC or AC/DC topologies, e.g. synchronous/non-synchronous boost converters, synchronous/non-synchronous buck converters, forward converters, or flyback converters.

The analog-to-digital conversion circuit 102 is coupled to the multi-phase power conversion circuit 101 to receive N current sampling signals CS1-CSN, each of the N current sampling signals CS1-CSN represents a current flowing through the corresponding switching circuits, and the analog-to-digital conversion circuit 102 is configured to generate N digital current signals i_phase1-i_phaseN. Wherein each of the N digital current signals i_phase1-i_phaseN can represent an average current of the corresponding switching circuit. The on-time adjustment signal generation circuit 103 is coupled to the analog-to-digital conversion circuit 102 to receive the N digital current signals i_phase1-i_phaseN, and is configured to generate N on-time adjustment signals Δton1-ΔtonN based on the digital current signals i_phase1-i_phaseN and a reference current signal i_ref, wherein the reference current signal i_ref may be a fixed predetermined value or one of the N digital current signals i_phase1-i_phaseN. The fault detection circuit 104 is coupled to the on-time adjustment generation circuit 103 to receive the N on-time adjustment signal Δton1-ΔtonN, and is configured to generate N fault signals fault1-faultN based on the N on-time adjustment signals Δton1-ΔtonN. Each of the N fault signals fault1-faultN is configured to indicate whether the corresponding switching circuit is fault. The control circuit 105 is coupled to the fault detection circuit 104 to receive the N fault signals fault1-faultN, and is configured to adjust N control signals PWM1-PWMN based on the N fault signals fault1-faultN. In one embodiment, when one of the N fault signals fault1-faultN indicates a switching circuit fault, the corresponding control signal will be adjusted to control the associated switching circuit being off, for example, if the fault signal faultN is logic high, the corresponding control signal PWMN will be adjusted to maintain logic low, and the associated Nth-switching circuit is configured to remain off.

Figure 2A:
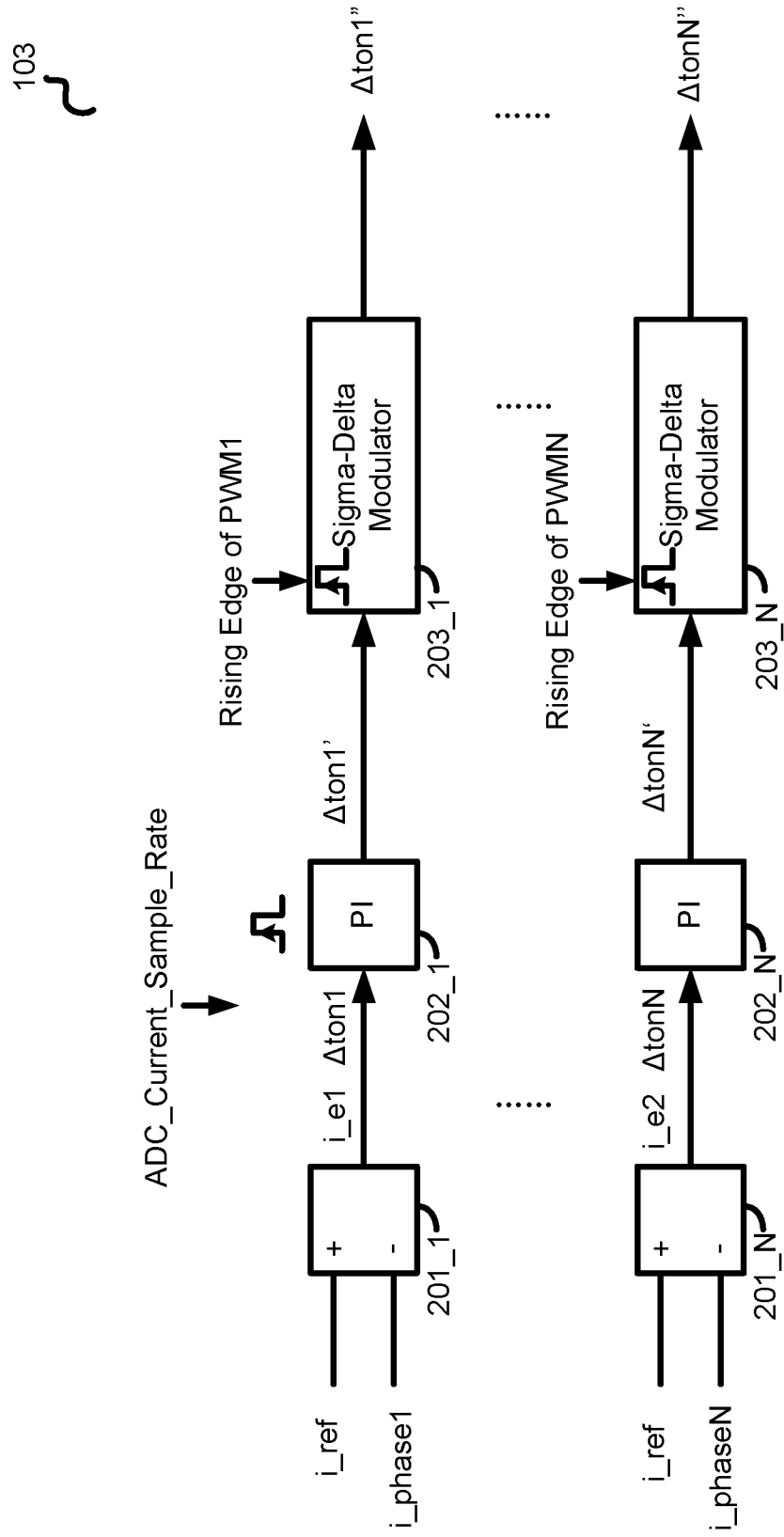
FIG. 2A illustrates a circuit schematic of an on-time adjustment signal generating circuit 103 shown in FIG. 1 in accordance with an embodiment of the present invention.

FIG. 2A illustrates a circuit schematic of the on-time adjustment signal generating circuit 103 shown in FIG. 1 in accordance with an embodiment of the present invention. The on-time adjustment signal generation circuit 103 comprises subtractors 201_1-201_N, wherein each subtractor 201_x comprises a first input terminal, a second input terminal and an output terminal, wherein the first input terminal of the subtractor 201_x is configured to receive a reference current signal i_ref, the second input terminal of the subtractor 201_x is configured to receive the corresponding digital current signal i_phasex. Wherein x is larger than or equal to 1 and is less than or equal to N, i.e., 1≤X≤N. The subtractor 201_x is configured to subtract the digital current signal i_phasex from the reference current signal i_ref, and is configured to provide a current error signal i_ex representing a difference between i_ref and i_phasex at the output terminal of the subtractor 201_x. Each current error signal i_ex is configured to correspond to a digital on-time adjustment signal Δtonx, for example, i_eN is configured to correspond to the on-time adjustment signal ΔtonN. In one embodiment, the on-time adjustment signal Δtonx may be equal or different to the corresponding current error signal i_ex. A correspondence between Lex and Δtonx can be predetermined. For example, when i_ex is 0, the corresponding Δtonx is 1, and when i_ex is 1, the corresponding Δtonx is 3. Different correspondences can be set according to different requirements of application. The on-time adjustment signal Δtonx represents an on-time adjustment of the current of the corresponding switching circuit, e.g., if a current of the switching circuit deviates from a reference current, the current of the corresponding switching circuit is configured to be adjusted by adjusting the on-time adjustment signal Δtonx.

In one embodiment, the on-time adjustment signal Δtonx is configured to be P-bit, and a second on-time adjustment signal Δtonx' is configured to be high Q-bit. And the second on-time adjustment signal Δtonx' is configured to be the on-time adjustment signal instead of the on-time adjustment signal Δtonx transmitted to the fault detection circuit 104, wherein P is greater than or equal to Q.

In one embodiment, the on-time adjustment signal generation circuit 103 further comprises a precision adjustment circuit for expanding the P-bit on-time adjustment signal Δtonx to a S-bit second on-time adjustment signal Δtonx', in order to improve the resolution. The second on-time adjustment signal Δtonx' is configured to be transmitted to the fault detection circuit 104 as the on-time adjustment signal instead of the on-time adjustment signal Δtonx, wherein S is greater than P.

In one embodiment, the on-time adjustment signal generation circuit 103 further comprises a proportional integrator 202_1-202-N, each proportional integrator 202_x comprises an input terminal and an output terminal, wherein the input terminal of the proportional integrator 202_x is configured to receive the corresponding on-time adjustment signal Δtonx, and each proportional integrator 202_x is configured to generate a second on-time adjustment signal Δtonx' based on the on-time adjustment signal Δtonx at the output terminal. The second on-time adjustment signal Δtonx' is transmitted to the fault detection circuit 104 as the on-time adjustment signal instead of the on-time adjustment signal Δtonx. Under a control of a pulse signal ADC_Current_Sample_Rate, the proportional integrator 202_x is configured to be triggered and configured to perform the proportional integral operation at a moment a current sampling signal of the corresponding switching circuit is converted to a logic signal.

In one embodiment, the on-time adjustment signal generation circuit 103 further comprises Σ-Δ (sigma-delta) modulators 203_1-203_N. Each Σ-Δ modulator 203_x comprises an input terminal and an output terminal, wherein the input terminal of the Σ-Δ modulator 203_x is coupled to the output terminal of the corresponding proportional integrator 202_x to receive the corresponding second on-time adjustment signal Δtonx'. The Σ-Δ modulator 203_x is configured to perform Σ-Δ modulation on the second on-time adjustment signal Δtonx', and is configured to generate a third on-time adjustment signal Δtonx" at the output terminal of the Σ-Δ modulator 203_x. And the third on-time adjustment signal Δtonx" is transmitted to the fault detection circuit 104 as the on-time adjustment signal instead of the on-time adjustment signal Δtonx. The second on-time adjustment signal Δtonx' is a P-bit (e.g. 10-bit) digital signal, and the third on-time adjustment signal Δtonx" is a Q-bit (e.g. 4-bit) digital signal, wherein P is greater than Q. In one embodiment, the Σ-Δ modulator 203_x is triggered on a rising edge of the corresponding control signal PWMx to perform Σ-Δ modulation.

Figure 2B:
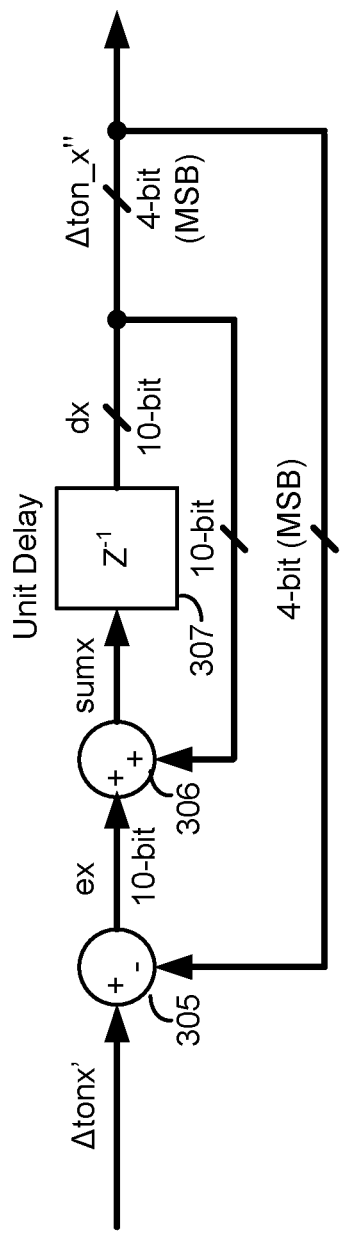
FIG. 2B illustrates a circuit schematic of a Σ-Δ modulator shown in FIG. 2A in accordance with an embodiment of the present invention.

FIG. 2B illustrates a circuit schematic of the Σ-Δ modulator 203 shown in FIG. 2A in accordance with an embodiment of the present invention. The Σ-Δ modulator 203 comprises a subtractor 305, an adder 306, and a unit delay module 307. The subtractor 305 comprises a first input terminal, a second input terminal, and an output terminal, wherein the first input terminal is configured to receive the second on-time adjustment signal Δtonx', and the second input terminal is configured to receive the third on-time adjustment signal Δtonx". The subtractor 305 is configured to subtract the third on-time adjustment signal Δtonx" from the second on-time adjustment signal Δtonx', and is configured to generate an error signal ex at the output terminal of the subtractor 305. In particular, since bit numbers of the second on-time adjustment signal Δtonx' and the third on-time adjustment signal Δtonx" are not equal, the subtractor 305 is configured to fill the insufficient low bits of the third on-time adjustment signal Δtonx" with zero while performing the subtraction operation. The bit number of the error signal ex generated by the subtractor 305 is equal to the bit number of the second on-time adjustment signal Δtonx', and ex is a P-bit (e.g. 10-bit) digital signal. The adder 306 comprises a first input terminal, a second input terminal and an output terminal, wherein the first input terminal of the adder 306 is coupled to the output terminal of the subtractor 305 to receive the error signal ex, the second input terminal of the adder is configured to receive a loop signal dx. The adder 306 is configured to add the error signal ex to the loop signal dx to generate a sum signal sumx at the output terminal of the adder 306. The unit delay module 307 comprises an input terminal and an output terminal, wherein the input terminal of the unit delay module 307 is coupled to the output terminal of the adder 306 to receive the sum signal sumx, and the unit delay module 307 is configured to delay the sum signal sumx and generate a delayed signal as the loop signal dx to the second input terminal of the adder 306. The delay time of the unit delay module 307 may be equal to one switching cycle of the corresponding switching circuit, or may be other suitable values. The bit number of the loop signal dx is equal to the bit number of the error signal ex, and dx is a P-bit (e.g. 10-bit) digital signal. The high Q-bit (e.g. the upper 4-bit) of the loop signal dx is taken out to be the third on-time adjustment signal Δtonx", which is transmitted to the fault detection circuit 104 as the on-time adjustment signal instead of the on-time adjustment signal Δtonx.

Specifically, the subtractor 305, the adder 306, and the unit delay module 307 together form a negative feedback loop. The purpose of the negative feedback loop is to make the error signal ex tend to zero. The high Q-bit (e.g. the upper 4-bit) of the second on-time adjustment signal Δtonx' is configured to be a constant offset portion for current sharing, and the lower (P-Q)-bit (e.g. the lower 6-bit) is configured to be utilized to modulate the lowest bit of the third on-time adjustment signal tonx", in order to increase the current adjustment rate of the multi-phase converter. The third on-time adjustment signal Δtonx" can be regarded as a pulse signal whose width varies with 1 LSB on the basis of the high Q-bit of the second on-time adjustment signal Δtonx'. The time interval between each pulse is variable, and the pulse interval is determined by the feedback loop. If the second on-time adjustment signal Δtonx' is small, the interval is long, and if the third on-time adjustment signal Δtonx" is big, the interval is short. Finally, within a fixed sampling period Tad, the average value of the third on-time adjustment signal Δtonx" will reflect the second on-time adjustment signal Δtonx'. Based on the use of the Σ-Δ modulator, the current regulation rate of the multi-phase converter is significantly improved. In applications where P=10 and Q=4, the current regulation rate of the multi-phase converter can be increased to 64 times the current regulation rate of the prior art.

Figure 3:
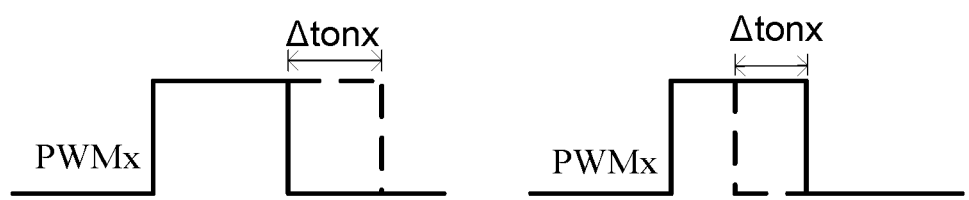
FIG. 3 illustrates waveforms of an on-time adjustment signal in accordance with an embodiment of the present invention.

FIG. 3 illustrates waveforms of the on-time adjustment signal Δtonx in accordance with an embodiment of the present invention. Each of the N switching circuits is configured to receive a corresponding control signal PWMx. When the current flowing through one switching circuit deviates from a target value, the multi-phase converter 100 is configured to adjust a logic high time period of the corresponding control signal PWMx to make the current flowing through the switching circuit reaching the target value. As an example, when the current flowing through the switching circuit is smaller than the target value, the corresponding control signal PWMx will be adjusted to maintain logic high longer for an additional first time period represented by the on-time adjustment signal Δtonx, and after the additional first time period, the current flowing through the switching circuit reaches the target value, the corresponding control signal PWMx is configured to become logic low; when the current of the switching circuit is greater than the target value, the corresponding control signal PWMx will be adjusted to become logic low in advance by a second time period represented by the on-time adjustment signal Δtonx. Therefore, the on-time adjustment signal Δtonx may be a positive value or a negative value. In one embodiment, when a switching circuit is fault, the current flowing through the switching circuit is approximately equal to zero, no matter how large the on-time adjustment signal Δtonx is, the current flowing through the fault switching circuit cannot reach the target value. In this case, in order to maintain a normal operation of the multi-phase converter, it is impossible to let the corresponding on-time adjustment signal Δtonx increase indefinitely, so a threshold value for the on-time adjustment signal Δtonx is needed. In one embodiment, a threshold signal is predetermined representing the threshold value. When the on-time adjustment signal Δtonx is greater than the threshold signal, it can be determined that the switching circuit is fault. The threshold signal can be set by users according to requirements. In short, when an absolute value of the on-time adjustment signal Δtonx is greater than the threshold signal, it can be determined that the switching circuit is fault.

Figure 4A:
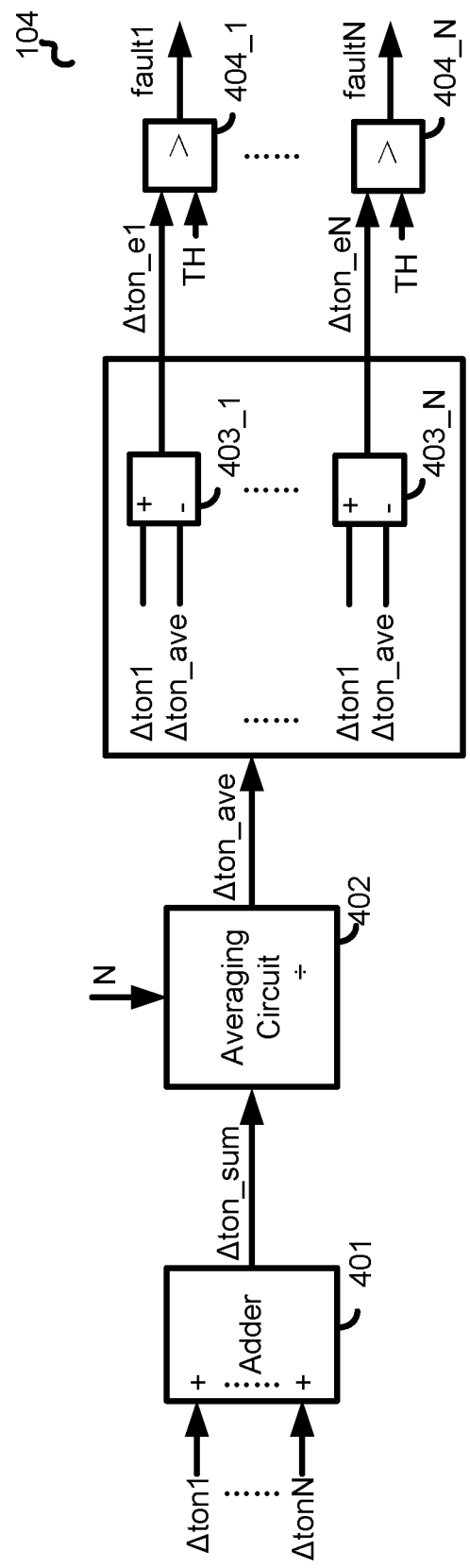
FIG. 4A illustrates a circuit schematic of a fault detection circuit 104 in accordance with an embodiment of the present invention.

FIG. 4A illustrates a circuit schematic of the fault detection circuit 104 in accordance with an embodiment of the present invention. The fault detection circuit 104 comprises an adder 401, an averaging circuit 402, N subtractors 403_1-403_N, and N comparators 404_1-404_N. The adder 401 is configured to receive the N on-time adjustment signals Δton1-ΔtonN and sum the N on-time adjustment signals Δton1-ΔtonN to output an on-time adjustment sum signal Δton_sum. The averaging circuit 402 comprises a divider having a first input terminal, a second input terminal, and an output terminal, the first input terminal of the averaging circuit 402 is coupled to the output terminal of the adder 401 to receive the on-time adjustment sum signal Δton_sum, the second input terminal is configured to receive a value N representing a phase number of the multi-phase converter. The divider 402 is configured to divide the on-time adjustment sum signal Δton_sum by N to output an average adjustment signal Δton_ave at the output terminal of the divider 402. Each subtractor 403_x comprises a first input terminal, a second input terminal and an output terminal, wherein the first input terminal is coupled to the on-time adjustment generation circuit 103 to receive the on-time adjustment signal Δtonx, and the second input terminal is coupled to the averaging circuit 402 to receive the average adjustment signal Δton_ave. The subtractor 403_x is configured to subtract the on-time adjustment signal Δtonx from the average adjustment signal Δton_ave to output an on-time adjustment error signal Δton_ex at the output terminal of the subtractor 403_x. The N subtractors 403_1-403_N are configured to generate N on-time adjustment error signal Δton_e1-Δton_eN. Each comparator 404_x comprises a first input terminal, a second input terminal and an output terminal, wherein the first input terminal of the comparator 404_x is coupled to the subtractor 403_x to receive the on-time adjustment error signal Δton_ex, and the second input terminal of the comparator 404_x is configured to receive a threshold signal TH. The comparator 404_x is configured to compare the on-time adjustment error signal Δton_ex with the threshold signal TH to output the fault signal faultx at the output terminal of the comparator 404_x. The comparators 404_1-404_N are configured to generate the N fault signals fault1-faultN.

In one embodiment, when an absolute value of the on-time adjustment error signal Δton_ex is greater than the threshold signal TH, that is, when a deviation or difference between the on-time adjustment signal Δtonx and the average adjustment signal Δton_ave exceeds the threshold signal TH, the fault signal faultx is configured to indicate the corresponding switching circuit is wrong, e.g., the fault signal faultx is configured to be logic high, the corresponding control signal PWMx is configured to maintain logic low, and the corresponding switching circuit is configured to maintain off.

In one embodiment, the N input terminals of the subtractor 403 can also be configured to receive the N second on-time adjustment signal Δton1'-ΔtonN'. In another embodiment, the N input terminals of the subtractor 403 can also be configured to receive the N third on-time adjustment signal Δton1"-ΔtonN".

Figure 4B:
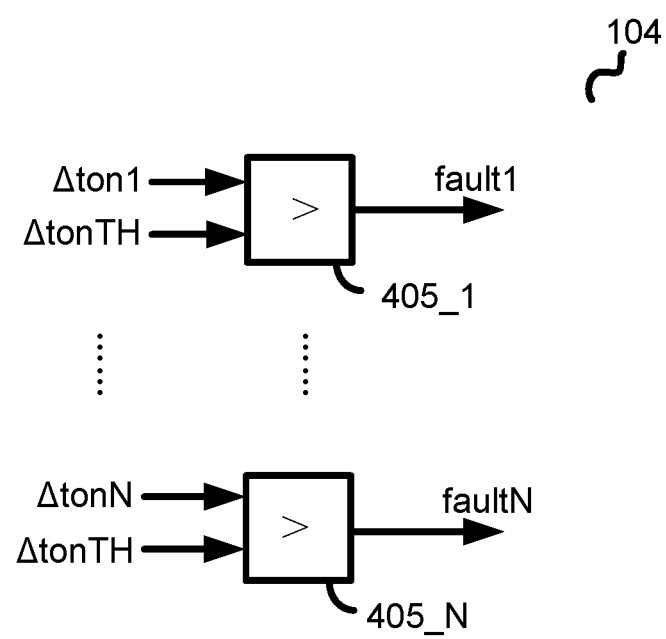
FIG. 4B illustrates a circuit schematic of the fault detection circuit 104 in accordance with another embodiment of the present invention.

FIG. 4B illustrates a circuit schematic of the fault detection circuit 104 in accordance with another embodiment of the present invention. The fault detection circuit 104 comprises comparators 405_1-405_N. Each comparator 405_x comprises a first input terminal, a second input terminal and an output terminal, wherein the first input terminal of the comparator 405_x is coupled to the on-time adjustment signal generation circuit 103 to receive the corresponding on-time adjustment signal Δtonx, and the second input terminal of the comparator 405_x is configured to receive a predetermined on-time adjustment threshold signal ΔtonTH. The comparator 405_x is configured to compare the on-time adjustment signal Δtonx with the predetermined on-time adjustment threshold signal ΔtonTH to output the fault signal faultx at the output terminal of the comparator 405_x, wherein the fault signal faultx represents one of the N fault signal fault1-faultN.

Figure 5:
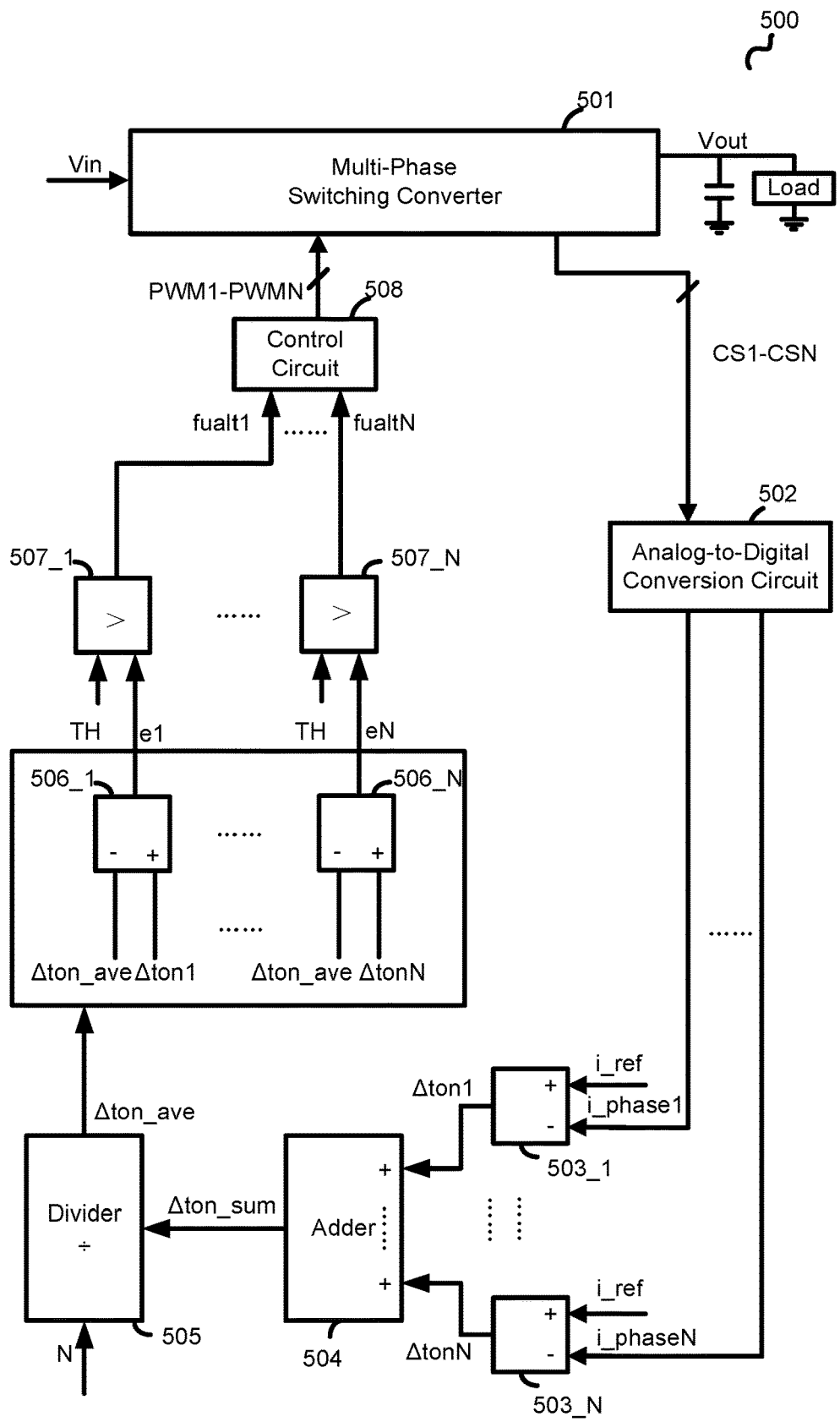
FIG. 5 illustrates a block diagram of a multi-phase converter 500 in accordance with an embodiment of the invention.

FIG. 5 illustrates a block diagram of a multi-phase converter 500 in accordance with an embodiment of the invention. The multi-phase converter 500 comprises a multi-phase power conversion circuit 501, an analog-to-digital conversion circuit 502, subtractors 503_1-503_N, an adder 504, a divider 505, subtractors 506_1-506_N, comparators 507_1-507-N and a control circuit 508, these circuits are basically the same as the corresponding circuits in the foregoing embodiments. The analog-to-digital conversion circuit 502 is configured to receive the N current sampling signals CS1-CSN representing the currents flowing through the N switching circuits, and is configured to generate N digital current signals i_phase1-i_phaseN, wherein N is a natural number greater than or equal to 2; subtractors 503_1-503_N are configured to receive the N digital current signals i_phase1-i_phaseN and the reference current signal i_ref, and is configured to respectively subtract the received N digital current signals i_phase1-i_phaseN from the reference current signal i_ref to obtain the N on-time adjustment signal Δton1-ΔtonN; the adder 504 is configured to receive the N on-time adjustment signal Δton1-ΔtonN, and is configured to sum the N on-time adjustment signals Δton1-ΔtonN to obtain an on-time adjustment sum signal Δton_sum; the divider 505 is configured to divide the on-time adjustment sum signal Δton_sum by the phase number N of the multi-phase converter to obtain an average adjustment signal Δton_ave; the subtractors 506_1-506_N are configured to receive the average adjustment signal Δton_ave and the N on-time adjustment signal Δton1-ΔtonN, and is configured to subtract the N on-time adjustment signal Δton1-ΔtonN from the average adjustment signal Δton_ave respectively to obtain N on-time adjustment error signals e1-eN; the comparators 507_1-507_N are configured to receive the N on-time adjustment error signals e1-eN and a threshold signal TH, and is configured to respectively subtract the N on-time adjustment error signals e1-eN from the threshold signal TH to obtain N fault signals fault1-faultN. In one embodiment, when the absolute value of the on-time adjustment error signal ex is greater than the threshold signal TH, the corresponding fault signal faultx is configured to indicate that the corresponding switching circuit is fault, e.g., the corresponding fault signal faultx is configured to become logic high. For example, when the on-time adjustment error signals eN is greater than the threshold signal TH, and the fault signal faultN is logic high, it is configured to indicate that the Nth switching circuit is fault. In one embodiment, when one of the fault signals fault1-faultN received by the control circuit 508 indicates that the corresponding switching circuit is fault, the control circuit 508 is configured to output the associated control signal to control the corresponding switching circuit maintaining being off. For example, when the fault signal faultN received by the control circuit 508 is logic high, then the control signal PWMN output by the control circuit 508 becomes logic low and continues to maintain logic low. The control signals PWM1-PWMN are configured to be output to the multi-phase power conversion circuit 501 to control the corresponding switching circuits, for example, when the control signal PWMN received by the multi-phase power conversion circuit 501 is logic low, the corresponding Nth switching circuit will be configured to remain off.

Figure 6:
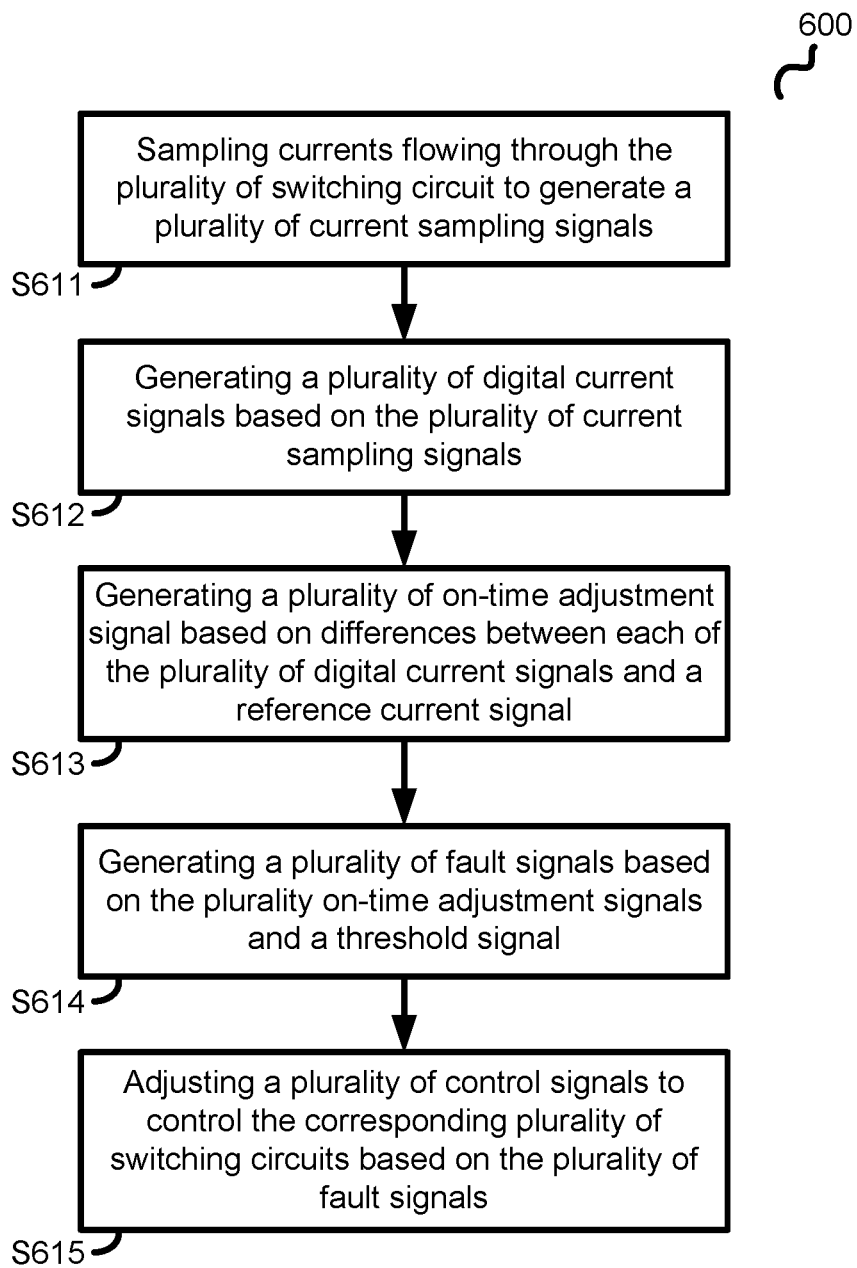
FIG. 6 illustrates a flowchart of a control method for a multi-phase converter in accordance with an embodiment of the invention.

FIG. 6 illustrates a flowchart of a control method of a multi-phase converter in accordance with an embodiment of the invention, wherein the multi-phase converter comprises a plurality of switching circuits, and each of the plurality of switching circuits having an output terminal coupled to a load, the method comprising steps S611 to S615.

At step S611, sampling currents flowing through the plurality of switching circuits to generate a plurality of the current sampling signals.

At step S612, generating a plurality of digital current signals based on the plurality of current sampling signals.

At step S613, generating a plurality of on-time adjustment signals based on differences between each of the plurality of the digital current signals and a reference current signal, wherein each of the plurality of on-time adjustment signals represents an on-time adjustment of the current of the corresponding switching circuit. In one embodiment, the reference current signal is a fixed predetermined value; in another embodiment, the reference current signal is one of the multiple digital current signals.

At step S614, generating a plurality of fault signals based on the plurality of on-time adjustment signals and a threshold signal. In one embodiment, when an absolute value of one of the plurality of on-time adjustment signal is greater than a predetermined value, it is judged that the corresponding switching circuit is fault, e.g., the associated fault signal is configured to become logic high. In another embodiment, the plurality of on-time adjustment signals are averaged to generate an average adjustment signal; each of the plurality of on-time adjustment signals is configured to be subtracted from the average adjustment signal to generate a plurality of on-time adjustment error signals; each of the plurality of on-time adjustment error signals is configured to be compared with a threshold signal to generate a plurality of fault signals, wherein the threshold signal can be programmed by users. In one embodiment, when the absolute value of the adjustment error signal is greater than the threshold signal, it is judged that the corresponding switching circuit is fault, e.g., the corresponding fault signal is configured to become logic high.

At step S615, adjusting a plurality of control signals to control the corresponding plurality of switching circuits based on the plurality of fault signals. In one embodiment, when one of the plurality of fault signals becomes logic high, the corresponding control signal is configured to become logic low and continuously maintain logic low, and the corresponding switching circuit is configured to maintain off.

Figure 7:
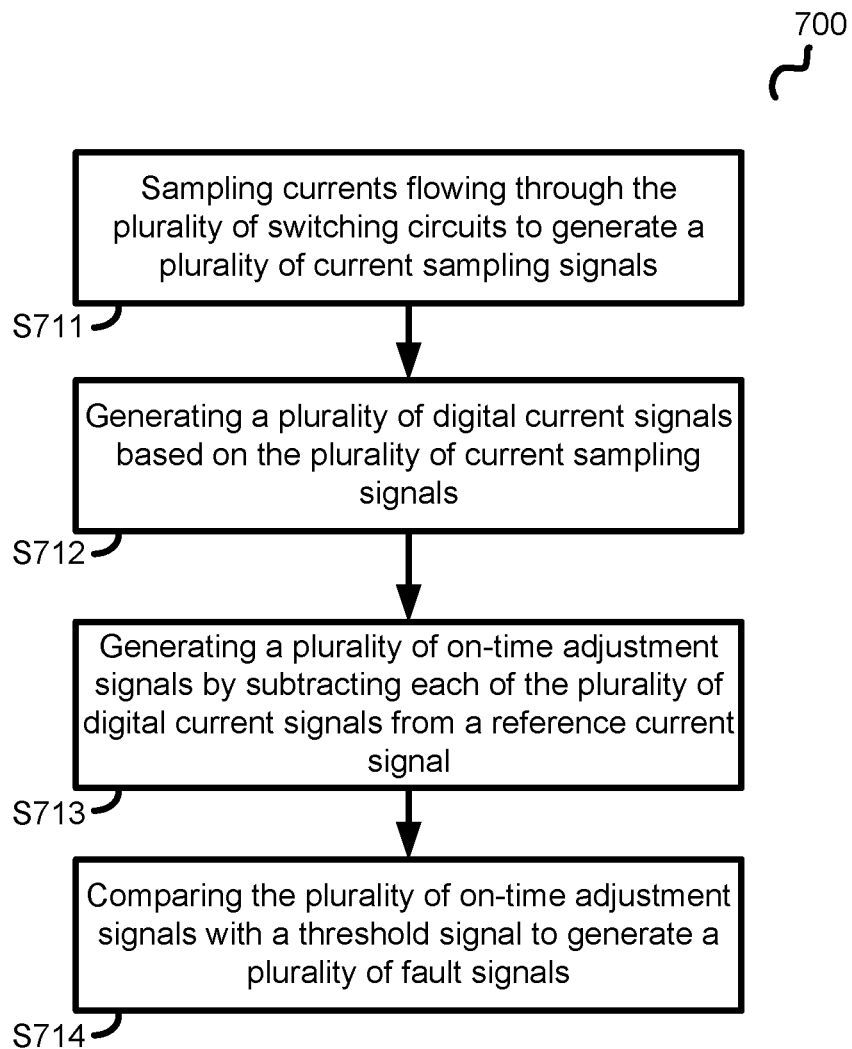
FIG. 7 illustrates a flowchart of a fault detection method for a multi-phase converter in accordance with an embodiment of the present invention.

FIG. 7 illustrates a flowchart of a fault detection method for a multi-phase converter in accordance with an embodiment of the present invention, wherein the multi-phase converter comprises a plurality of switching circuits, and each of the plurality of switching circuits having an output terminal coupled to a load, the fault detection method comprising steps S711 to S714.

At step S711, sampling currents flowing through the plurality switching circuits to generate a plurality of current sampling signals.

At step S712, generating a plurality of digital current signals based on the plurality of current sampling signals.

At step S713, generating a plurality of on-time adjustment signals by subtracting each of the plurality of digital current signals from a reference current signal, wherein each of the plurality of on-time adjustment signals represents an on-time adjustment of a corresponding one of the plurality of switching circuits.

At step S714, comparing the plurality of on-time adjustment signals with a threshold signal to generate a plurality of fault signals. In one embodiment, when an absolute value of one of the plurality of on-time adjustment signals is greater than a predetermined value, it is judged that the corresponding one of the plurality of switching circuits is fault, e.g., the corresponding one of the plurality of fault signals is configured to become logic high.

The above description and discussion about specific embodiments of the present invention is for purposes of illustration. However, one with ordinary skill in the relevant art should know that the invention is not limited by the specific examples disclosed herein. Variations and modifications can be made on the apparatus, methods and technical design described above. Accordingly, the invention should be viewed as limited solely by the scope and spirit of the appended claims.

We claim:

1. A controller for a multi-phase converter, wherein the multi-phase converter comprises a plurality of switching circuits coupled in parallel, the controller comprising:
   an analog-to-digital conversion circuit, configured to receive a plurality of current sampling signals, and configured to generate a plurality of digital current signals based on the plurality of current sampling signals, wherein each of the plurality of current sampling signals respectively represents an associated current flowing through a corresponding one of the plurality of switching circuits;

an on-time adjustment signal generation circuit, coupled to the analog-to-digital conversion circuit to receive the plurality of digital current signals, and configured to generate a plurality of on-time adjustment signals based on differences between each of the plurality of digital current signals and a reference current signal, wherein each of the plurality of on-time adjustment signals represents an on-time adjustment of the corresponding one of the plurality of switching circuits;

a fault detection circuit, coupled to the on-time adjustment generation circuit to receive the plurality of on-time adjustment signals, and configured to generate a plurality of fault signals based on the plurality of on-time adjustment signals and a threshold signal; and a control circuit, coupled to the fault detection circuit to receive the plurality of fault signals, and configured to generate a plurality of control signals based on the plurality of fault signals to control the plurality of switching circuits respectively.

2. The controller of claim 1, wherein when a deviation between one of the plurality of on-time adjustment signals and an average adjustment signal exceeds the threshold signal, a corresponding one of the plurality of fault signals is configured to indicate that the corresponding one of the plurality of switching circuits is fault, and a corresponding control signal is configured to maintain the corresponding one of the plurality of switching circuits off, wherein the average adjustment signal represents an average of the on-time adjustments of the plurality of switching circuits.

3. The controller of claim 1, further comprising:
a precision adjustment circuit, coupled between the on-time adjustment signal generation circuit and an averaging circuit, and configured to extract a high Q-bit of the plurality of on-time adjustment signals as a plurality of second on-time adjustment signals, wherein the plurality of on-time adjustment signals are configured to be P-bit, P is greater than or equal to Q, and the plurality of second on-time adjustment signals are configured to be transmitted to the averaging circuit as the plurality of on-time adjustment signals.

4. The controller of claim 1, further comprising:
a precision adjustment circuit, coupled between the on-time adjustment signal generation circuit and an averaging circuit, configured to convert the plurality of on-time adjustment signals into corresponding plurality of high-precision on-time adjustment signals, wherein the plurality of on-time adjustment signals are configured to be P-bit, and the corresponding plurality of high-precision on-time adjustment signals are configured to be S-bit, S is greater than P, and the corresponding plurality of high-precision on-time adjustment signals are transmitted to the averaging circuit as the plurality of on-time adjustment signals.

5. The controller of claim 1, wherein the on-time adjustment signal generation circuit further comprises:
a plurality of subtractors, wherein each of the plurality of subtractors comprises a first input terminal, a second input terminal, and an output terminal, the first input terminal of each of the plurality of subtractors is configured to receive the reference current signal, the second input terminal of each of the plurality of subtractors is configured to receive a corresponding one of the plurality of digital current signals, and the output terminal of each of the plurality of subtractors is configured to provide a corresponding one of the plurality of on-time adjustment signals via subtracting the reference current signal from the corresponding one of the plurality of digital current signals.

6. The controller of claim 5, wherein the on-time adjustment signal generation circuit further comprises:
a plurality of proportional integrators, each of the plurality of proportional integrators comprises an input terminal and an output terminal, wherein the input terminal of each of the plurality of proportional integrators is coupled to the output terminal of a corresponding one of the plurality of subtractors to receive the corresponding one of the plurality of on-time adjustment signals, and the output terminal of each of the plurality of proportional integrators is configured to provide an integration signal as the corresponding one of the plurality of on-time adjustment signals.

7. The controller of claim 1, wherein the fault detection circuit further comprises:
an averaging circuit, coupled to the on-time adjustment signal generation circuit to receive the plurality of on-time adjustment signals, and configured to generate an average adjustment signal by averaging the plurality of on-time adjustment signals;

a plurality of subtractors, coupled to the on-time adjustment signal generation circuit to receive the plurality of on-time adjustment signals, coupled to the averaging circuit to receive the average adjustment signal, and configured to subtract each of the plurality of on-time adjustment signals from the average adjustment signal to generate a plurality of adjustment error signals; and a plurality of comparators, coupled to the plurality of subtractors to receive the plurality of adjustment error signals, and configured to compare each of the plurality of adjustment error signals with the threshold signal to generate the plurality of fault signals; wherein when an absolute value of one of the plurality of adjustment error signals is greater than the threshold signal, a corresponding one of the plurality of fault signals is configured to indicate that the corresponding one of the plurality of switching circuits is fault.

8. The controller of claim 7, wherein the averaging circuit further comprises:
an adder, comprising a plurality of input terminals and an output terminal, wherein the plurality of input terminals of the adder is configured to receive the plurality of on-time adjustment signals, and the output terminal of the adder is configured to provide an adjustment sum signal via summing the plurality of on-time adjustment signals; and a divider, comprising a first input terminal, a second input terminal and an output terminal, wherein the first input terminal of the divider is configured to receive the adjustment sum signal, the second input terminal of the divider is configured to receive a phase number signal representative of a number of the plurality of switching circuits, and the output terminal of the divider is configured to provide the average adjustment signal via dividing the adjustment sum signal by the phase number signal.

9. A fault detection method for a multi-phase converter, wherein the multi-phase converter comprises a plurality of switching circuits coupled in parallel, the fault detection method comprising:
generating a plurality of digital current signals based on a plurality of current sampling signals, wherein each of the plurality of current sampling signals respectively represents an associated current flowing through a corresponding one of the plurality of switching circuits;

generating a plurality of on-time adjustment signals based on differences between each of the plurality of digital current signals and a reference current signal, wherein each of the plurality of on-time adjustment signals represents an on-time adjustment of the corresponding one of the plurality of switching circuits;

generating a plurality of fault signals based on the plurality of on-time adjustment signals and a threshold signal; and adjusting a plurality of control signals based on the plurality of fault signals to control the plurality of switching circuits respectively.

10. The fault detection method of claim 9, wherein when a deviation between one of the plurality of on-time adjustment signals and an average adjustment signal exceeds the threshold signal, a corresponding one of the plurality of fault signals is configured to indicate that the corresponding one of the plurality of switching circuits is fault, wherein the average adjustment signal represents an average of the on-time adjustments of the plurality of switching circuits.

11. The fault detection method of claim 9, wherein generating the plurality of fault signals based on the plurality of on-time adjustment signals and the threshold signal further comprises:

averaging the plurality of on-time adjustment signals to generate an average adjustment signal;

subtracting each of the plurality of on-time adjustment signals from the average adjustment signal to generate a corresponding plurality of adjustment error signals; and comparing each of the corresponding plurality of adjustment error signals with the threshold signal to generate a plurality of fault signals; wherein when an absolute value of one of the plurality of adjustment error signals is greater than the threshold signal, a corresponding one of the plurality of fault signals is configured to indicate the corresponding one of the plurality of switching circuits is fault.

12. The fault detection method of claim 9, further comprising:

converting the plurality of on-time adjustment signals into a plurality of high-precision on-time adjustment signals respectively, wherein the plurality of on-time adjustment signals is configured to be P-bit, the plurality of high-precision on-time adjustment signals are configured to be S-bit, S is greater than P, and the plurality of high-precision on-time adjustment signals are configured to be transmitted to an averaging circuit as the plurality of on-time adjustment signals.

13. The fault detection method of claim 9, wherein a difference between each of the plurality of digital current signals and the reference current signal is configured to correspond to a corresponding one of a plurality of predetermined values, and each of the plurality of the predetermined values is configured to be the corresponding one of the plurality of on-time adjustment signals.

14. The fault detection method of claim 9, wherein generating the plurality of on-time adjustment signals based on differences between each of the plurality of digital current signals and the reference current signal further comprises:

proportionally integrating a difference between each of the plurality of digital current signals and the reference current signal to generate a plurality of first offset signals;

performing $\Sigma$-$\Delta$ modulation on the plurality of first offset signals to generate a corresponding plurality of second offset signals;

subtracting each of the plurality of first offset signals from the corresponding plurality of second offset signals respectively to generate a plurality of error signals;

adding each of the plurality of error signals and a corresponding one of plurality of loop signals to produce a plurality of sum signals;

delaying each of the plurality of sum signals as the corresponding one of the plurality of loop signals; and extracting a high Q-bit of the corresponding one of the plurality of loop signals as a corresponding one of the plurality of second offset signals; wherein the corresponding one of the plurality of second offset signals is configured to be used as the corresponding one of the plurality of on-time adjustments to generate a corresponding one of the plurality of average adjustment signals.

15. A controller for a multi-phase converter, wherein the multi-phase converter comprises a plurality of switching circuits coupled in parallel, the controller comprising:

an analog-to-digital conversion circuit, configured to generate a plurality of digital current signals based on a plurality of current sampling signals, wherein each of the plurality of current sampling signals represents an associated currents flowing through a corresponding one of the plurality of switching circuits;

an on-time adjustment signal generation circuit, configured to generate a plurality of on-time adjustment signals based on differences between each of the plurality of digital current signals and a reference current signal, wherein the plurality of on-time adjustment signals represents on-time adjustments of the plurality of switching circuits;

a fault detection circuit, configured to generate a plurality of fault signals based on the plurality of on-time adjustment signals; and a control circuit, configured to generate a plurality of control signals based on the plurality of fault signals to control the plurality of switching circuits; wherein when an absolute value of one of the plurality of on-time adjustment signals is greater than a predetermined value, a corresponding one of the plurality of control signals is configured to maintain a corresponding one of the plurality of switching circuits off.

16. The controller of claim 15, wherein the fault detection circuit comprises:

a plurality of comparators, each of the plurality of comparators comprises a first input terminal, a second input terminal and an output terminal, wherein the first input terminal of each of the plurality of comparators is configured to receive a corresponding one of the plurality of on-time adjustment signals, the second input terminal of each of the plurality of comparators is configured to receive the predetermined value, and the output terminal of each of the plurality of comparators is configured to provide a corresponding one of the plurality of fault signals via comparing the corresponding one of the plurality of on-time adjustment signals with the predetermined value.

17. The controller of claim 15, further comprising;

a precision adjustment circuit, coupled between the on-time adjustment signal generation circuit and an averaging circuit, configured to convert the plurality of on-time adjustment signals into corresponding plurality of high-precision on-time adjustment signals, wherein the plurality of on-time adjustment signals are configured to be P-bit, and the corresponding plurality of high-precision on-time adjustment signals are configured to be S-bit, S is greater than P, and the corresponding plurality of high-precision on-time adjustment signals are transmitted to the averaging circuit as the plurality of on-time adjustment signals.

18. The controller of claim 15, wherein the on-time adjustment signal generation circuit further comprises:
   a plurality of subtractors, wherein each of the plurality of subtractors comprises a first input terminal, a second input terminal, and an output terminal, the first input terminal of each of the plurality of subtractors is configured to receive the reference current signal, the second input terminal of each of the plurality of subtractors is configured to receive a corresponding one of the plurality of digital current signals, and the output terminal of each of the plurality of subtractors is configured to provide a corresponding one of the plurality of on-time adjustment signals via subtracting the reference current signal from the corresponding one of the plurality of digital current signals.

19. The controller of claim 18, wherein the on-time adjustment signal generation circuit further comprises:
   a plurality of proportional integrators, each of the plurality of proportional integrators comprises an input terminal and an output terminal, wherein the input terminal of each of the plurality of proportional integrators is coupled to the output terminal of a corresponding one of the plurality of subtractors to receive the corresponding one of the plurality of on-time adjustment signals, and the output terminal of each of the plurality of proportional integrators is configured to provide an integration signal as the corresponding one of the plurality of on-time adjustment signals.

* * * * *